Oct. 20, 1964 R. E. TANCINCO 3,153,766

MODE OF OPERATION OF THE PENTODE OR TETRODE TUBE
IN THE OUTPUT STAGE OF AN AUDIO POWER AMPLIFIER

Filed Sept. 8, 1961

INVENTOR.

Renato S. Tancinco

3,153,766
MODE OF OPERATION OF THE PENTODE OR TETRODE TUBE IN THE OUTPUT STAGE OF AN AUDIO POWER AMPLIFIER

Renato E. Tancinco, Meycauayan, Bulacan, Philippines

Filed Sept. 8, 1961, Ser. No. 136,817
Claims priority, application Philippines Sept. 12, 1960
5 Claims. (Cl. 330—122)

This invention relates to a new concept in the mode of operation of a pentode or tetrode power tube in the output stage of an audio frequency amplifier. Up to the present stage of the art, the output tubes in an audio frequency amplifier operate only under one set of characteristics which is determined by the mode of operation assigned to them. The following are the modes of operations under which a pentode or tetrode power tube may be made to operate:

(1) Triode connected pentode or tetrode output stage.
(2) Distributed load pentode or tetrode output stage or the so called "Uutra Linear Amplifiers."
(3) Straight pentode or tetrode output stage.
(4) Unity coupled output stage.
(5) "Extended Class A Amplifier" using a pair of triode connected push pull pentode or tetrode in parallel with another pair of the same type of tubes connected as straight pentode or tetrode.

The sixth mode of operation is offered by the undersigned and is the subject of this patent application. In this new mode of operation, the output pentode or tetrode tube alternately operates between the two sets of characteristics assigned to them. These two sets of characteristics are determined by the position of the two taps on the plate winding of the output transformer to which the anodes of the back to back connected diodes, feeding the screen grid of the said power tube, are connected. The particular set of characteristics under which the output tube operates is determined by the polarity of the grid signal voltage relative to the quiescent potential of the control grid, otherwise known as the grid bias. Some of the objectives of this invention are as follows:

(1) To obtain high quality reproduction of sound without the necessity of using expensive special output transformers or resorting to complex circuitry.
(2) To be able to obtain the most power output available for a given power output tube and a given B-supply voltage, commensurate with high plate circuit efficiency, low distortion, and low power consumption during the absence of signal or during idling.
(3) To attain the above objectives without the necessity of using more than one pair of power output tubes or more than one power supply or B-Supply.
(4) To reduce the output impedance of the power output stage before the application of any inverse feedback.
(5) To be able to attain the above objectives without the need for very high signal grid drive voltage to the power output tubes.
(6) To give the amplifier designer a free hand in the design of the whole amplifier. The said freedom is achieved by virute of the following:
  (*a*) Absence of inherent inverse feedback in the output stage. The manner of application of the inverse feedback is left entirely to the amplifier designer.
  (*b*) The designer is free to choose any type of pentode or tetrode power tube for the power amplifier stage.
  (*c*) The choice of the position of the taps on the plate winding of the output transformer is the privilege of the amplifier designer. The positions chosen will determine the two different sets of characteristics between which the power output tube will alternately operate.

*The New Circuit*

A good amplifier must not only be good in performance but it must meet the requirements of the manufacturer, the amplifier designer, and above all satisfy the ultimate user, i.e., the owner.

It is a fact that in the reproduction of music, the high power peaks are relatively few and of very short durations, that, most of the time the amplifier may be considered as idling. Low consumption of power during idling is therefore of paramount importance. An amplifier is usually rated at the maximum power that it can deliver during these peaks, with a minimum of distortion and good stability. The maximum power that a pair of power tubes can deliver is usually limited by the maximum plate dissipation rating of the said power tube. To get therefore the most out of a pair of power tubes, the plate circuit efficiency of output stage should be high. It is also very desirable to obtain high power outputs without the necessity of using very high signal grid drive voltages. In other words, the power sensitivity of the output stage must be high. It is therefore clear that Class B operated pentode or tetrode power tubes appear to be ideal for the output stage. The requirement of low distortion in output stages using the conventional Class B pentode or tetrode power tubes is, however, not easily met. The cause is the presence of a form of distortion, called the notch distortion, which occurs as a notch or fuzziness in the output signal waveform. In reality, this fuzziness in the output signal waveform is a form of shock excited self oscillation at some ultra-sonic frequency in the plate winding of the output transformer. The leakage inductance between the plate windings of the output transformer forms an oscillatory circuit in combination with the winding capacitance and other stray capacitances. This oscillatory circuit is shock excited into self-oscillation every time the plate current of the power tube is driven to cut off. Unfortunately the frequency of this fuzziness or notch distortion is so high that it is beyond the effective control of the inverse feedback loop that may be applied in the amplifier. Furthermore, the plate current of the power tube which is the most logical part of the amplifier that can prevent the said distortion, has been driven to cut off. The said power tube, being then inactive, is therefore not in a position to prevent the occurrence of the said notch distortion. So far there are two successful solutions to the problem of preventing the occurrence of the notch distortion. They are exemplified in the Unity Coupled Amplifiers and the Extended Class A amplifiers. A third solution is offered by this invention, which is believed to be an entirely new concept in the mode of operation of pentode or tetrode power tubes in the output stage of an audio power amplifier.

The foregoing objectives will become more apparent from the following detailed description of various embodiments of the invention and from the accompanying drawings wherein.

Figure 1:
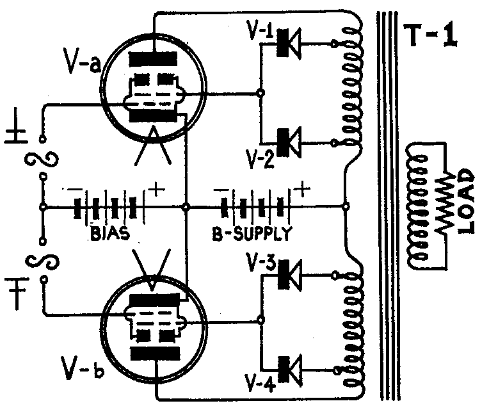
FIG. 1 is an electrical schematic diagram illustrating a push-pull tetrode power amplifier incorporating the switching diodes in circuit between the screen grids and output transformer.
Figure 2:
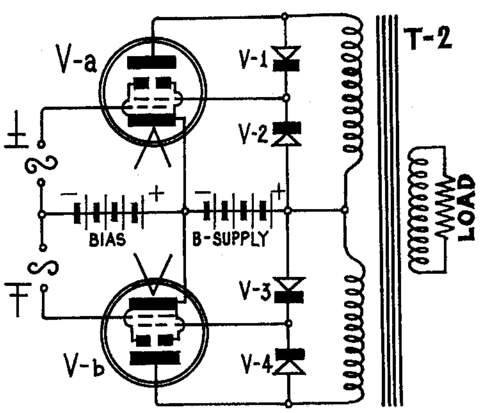
FIGS. 2–4 are views similar to FIG. 1 but illustrating various modifications for connecting in the switching diodes.

Referring to FIG. 1 of the annexed drawing which forms a part of this patent application, there is shown a push pull tetrode power amplifier, which is operated as a conventional Class B output stage except for the manner in which the screen grids of the power tetrodes V–*a* and V–*b* are fed. In a conventional output stage using Class B pentodes or tetrodes, the screen grids of the tubes are fed by the B-Supply for the plates or, if a different voltage is required for the screen grids, by a separate screen grid power supply. It will be noticed that the screen grids of the power tetrode tubes V–*a* and V–*b* are connected to the common cathodes of two pairs of back to back connected diodes, V–1, V–2, V–3 and V–4. The anodes of the diodes V–1 and V–2 are connected respectively to taps No. 1 and No. 2 on the corresponding plate winding of the output transformer T–1 and similarly the diodes V–3 and V–4. When the tetrode V–*a* grid is driven to the positive direction by the signal, the plate swings to the negative direction relative to the B-Plus terminal of the B-Supply. Such a situation makes tap No. 2 on the plate winding more positive than the tap No. 1, causing diode V–1 to cut off while diode V–2 remains conducting. Diode V–2 therefore, effectively ties the screen grid to tap No. 2 on the plate winding. Tube V–*a* will therefore behave in the same manner as when its screen grid is permanently connected to tap No. 2 of the plate winding of the output transformer. On the negative half of the signal wave, the grid of the power tetrode V–*a* is driven to the negative direction. The plate of the tube V–*a* then swings to the positive direction relative to the B-Plus terminal of the B-Supply. Tap No. 1 therefore of the plate winding of the output transformer then becomes more positive than tap No. 2, thus causing diode V–2 to cut off and diode V–1 to conduct instead. The conduction of diode V–1 effectively ties the screen grid of tube V–*a* to tap No. 1 in plate winding of the output transformer T–1. Tube V–*a* then, will therefore behave as if its screen grid is permanently connected to tap No. 1 of the plate winding of the output transformer. In the absence of a signal, the two diodes V–1 and V–2 are both conducting and are sharing the screen grid current drain of the tube V–*a*. It can be seen therefore that the characteristics of the power tetrode V–*a* during the positive half of the grid signal voltage is entirely different from those, during the negative half of the grid signal voltage. The tube V–*a* therefore automatically operates alternately between two different sets of characteristics, with the aid of diodes V–1 and V–2. The polarity of the grid signal voltage determines under which set of characteristics the power tetrode V–*a* will operate. It must be noted however that the positions of taps No. 1 and No. 2 on the plate winding of V–*a* are identical respectively to those of the taps No. 4 and No. 3 on the plate winding of V–*b*. The proper positions of the taps on the plate windings are left to the discretion of the amplifier designer. They can be anywhere from the B-Plus terminal to the plate terminal of the plate windings. The limiting positions of the taps is shown in FIG. 2 of this drawing. Here, tap No. 1 is at the plate terminal of the plate winding of the output transformer while the tap No. 2 is at the B-Plus terminal of the B-Supply. In FIG. 2 of the drawing, power tetrode V–*a* operates as a straight tetrode on the positive halves of the grid signal voltage, while during the negative halves, it operates as a triode. On the positive half of the grid signal voltage, the screen grid of tube V–*a* is tied to the B-Plus terminal of the B–Supply while on the negative half of grid signal voltage, the screen grid is connected to its plate. Automatic switching is accomplished by the back to back connected diodes V–1 and V–2. In this mode of operation, the output transformer T–2 can be any standard output transformer ordinarily available. Even though tube V–*a* is biased to the projected plate current cut off value like in conventional Class B amplifiers, its plate current can never reach cut off. The action of the control grid in forcing a plate current cut off during the negative halves of the grid signal voltage, is effectively counteracted by the rise in the potential of the screen grid which is then tied to the plate due to the conduction of diode V–1. The low plate impedance of the then triode connected V–*a* effectively damps the plate winding connected to it, thus preventing the winding from ever being shock excited into self-oscillation. The possibility therefore, of the occurrence of notch distortion, can entirely be precluded. The fact, that the tube V–*a* is connected as a tetrode during the positive halves of the grid signal voltage, makes it possible to obtain a relatively large power output at high plate circuit efficiency and at very low power consumption during idling, like in the conventional Class B tetrode power amplifiers. We therefore have now an amplifier that performs very much like a conventional Class B tetrode amplifier with all its advantages but without its disadvantages, i.e., the notch distortion. It should be noted however, that the grid drive voltage requirements are low and are the same as when the output tubes are connected as in a conventional Class B tetrode power amplifier.

In the prototype amplifier that was tried by the undersigned a pair of 807's were used for V–*a* and V–*b* and one pair of 6 x 4's were used in place of the diodes V–1, V–2, V–3 and V–4. The common cathodes of the 6 x 4's feed the screen grids of the 807's. The output transformer used was a "Merit" 55 watt P.A. output transformer with a plate to plate rated load of 3,300 ohms. The circuit used is shown on FIG. 2 of the drawing. Although the output stage operates as a Class B tetrode power amplifier, the output impedance, without any inverse feed back is low and the same as that of a triode amplifier. This low output impedance is the result of the alternate Tetrode-Triode operation of the output tubes.

Figure 3:
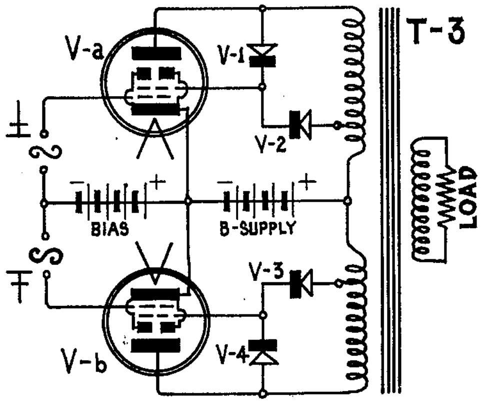

FIG. 3 of the drawing shows a mode of operation in which the power output tubes operates as a distributed load tetrodes or "Ultra Linear" amplifier during the positive halves of the grid signal voltage and as triodes during the negative halves of the grid signal voltage. As in FIG. 2, the possibility of the occurrence of notch distortion in this case is non-existent.

Figure 4:
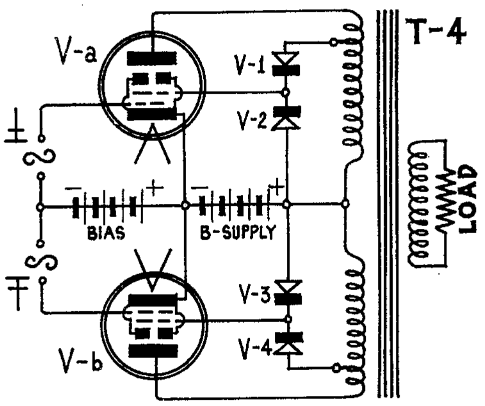
Figure 5:
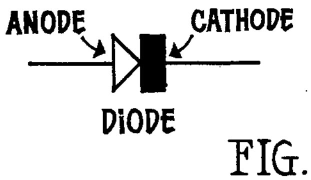
FIG. 5 is a detail of one of the switching diodes indicating the convention observed in designating its cathode and anode components.

The circuit in FIG. 4 is the same as in FIG. 2 except that the anode of the diode V–1 is connected to the tap No. 1 on the plate winding of the output transformer T–4. In this case the positive voltage applied to the screen grid of the tube V–*a* thru diode V–1 during the negative half of the grid signal voltage is just enough to prevent the plate current of the tetrode V–*a* from reaching the cut off point during the maximum power output of the amplifier.

In the foregoing discussions, the principles involved in the operation of this new amplifier can be fully understood. In regards to the diodes V–1, V–2, V–3 and V–4, semi-conductor diodes may be used in lieu of thermionic diodes, provided however, that the peak inverse voltage of the diodes are not exceeded during the delivery of maximum power to the load or when the amplifier is unloaded while in operation.

*Advantages of This Invention*

The advantages that may be derived from the application of this invention in the manufacture of high quality audio frequency power amplifiers may be summed up as follows:

(1) The application of this invention may be considered the most practical approach to the design and manufacture of high quality reliable audio power amplifiers that are capable of relatively high power output with low distortion, high plate circuit efficiency, low power consumption during idling, and at a reasonably low cost.

(2) The amplifier does not require specially designed output transformers. In fact, standard output transformers commonly available can be successfully used. There is no need for sectionalized and intermeshed plate windings that are required for the successful operation of the conventional distributed load or "Ultra Linear" amplifiers, nor is it necessary to use a special, bi-filar wound output transformer as in the case of the unity coupled McIntosh and Gow amplifier. The presence of the full B-Supply voltage between the turns of this bi-filar windings greatly affects the reliability of the whole amplifier.

(3) The amplifier requires only one power supply and this power supply is operated at signal ground potential. The "Extended Class" A–2 amplifier requires an additional well regulated screen grid power supply for its successful operation. The "Circlotron Amplifier" of Electro Voice, Inc. requires two separate and identical power supplies, one for each power output tube, and furthermore, these power supplies are operated above signal ground potential. The additional cost of the extra power supply is worth considering, and moreover, operating the power supplies above signal ground potential can affect the frequency characteristics and the stability of the whole amplifier.

(4) Only one pair of power output tubes are required for the successful operation of this amplifier. To equal the power output of a conventional amplifier using one pair of power output tubes, the "Extended Class A Amplifier" requires two pairs of power output tubes. Considering the present cost of good audio power output tubes, the additional cost of the extra pair of power tubes is certainly worth savings.

(5) The output impedance of this amplifier before the application of any inverse feed back is low and the same as that of a triode power amplifier. The alternate operation of the power output tubes as a triode or near triode during the negative halves of the grid signal voltage accounts for the low output impedance of this amplifier.

(6) Elimination of the notch distortion is accomplished in this amplifier without resorting to Unity Coupling or Extended Class A operation with their attendant disadvantages.

(7) Compared to Unity Coupled amplifiers, the signal grid drive voltage requirement of this amplifier is very low. It is not necessary to design a special driver stage to deliver the high signal voltages at low distortion as is called for in the Unity Coupled amplifiers. It is very possible for the driver stage to contribute most of the distortion in the output of an otherwise distortion free Unity Coupled amplifier. Specially designed driver stages can increase the cost of an amplifier and add to the complexity of the circuit.

(8) This amplifier is not very particular as to the type of the power output tube. The manufacturer or the amplifier designer is free to choose any power pentode or tetrode for the output stage of this amplifier.

(9) The absence of inherent inverse feedback in the output stage of this amplifier is a distinct advantage. The amplifier designer has therefore a free hand in the choice of the manner in which the inverse feedback may be applied. Inherent inverse feedback in the output stage is inevitable in Unity Coupled amplifiers. This inherent feedback accounts for the very high grid drive signal voltage requirements of Unity Coupled amplifiers.

(10) The fact that the notch distortion is non-existent in the amplifier, makes it advantageous to set the grid bias of the power output tubes to the projected cut off value of the plate current. The amplifier is therefore capable of relatively high power output at high plate circuit efficiency, attendant to low power consumption during idling. This will mean a very much longer life for the power output tubes, less power consumption and savings in money for both the manufacturer and the end user.

(11) The choice of the mode of operation of the power output tubes is entirely left to the discretion of the amplifier. The desired two different sets of characteristics under which the power output tubes will alternately operate may be obtained by the amplifier designer with the proper choice of the points in the plate windings of the output transformer to which the anodes of the back to back connected diodes are to be connected. The amplifier designer is therefore completely free to choose the two different sets of characteristics under which the power output tubes will alternately operate to obtain his desired results.

(12) The circuitry of this amplifier is very simple. The simplicity of the circuitry makes it easy for the manufacturer to duplicate the performance of the original model during the production run. Simplicity of the circuit contributes to the stability and reliability of the whole amplifier.

In class B power amplifiers, the push pull output tubes alternate in the delivery of power to the load. The power output tubes deliver power to the load, only during the positive half of the grid signal voltage. During the negative half of grid signal voltage, the plate current of the power tube is cut off. The power output tube is then inactive and therefore serving no useful purpose. The essence of this invention is to make the said inactive tube do some useful work, i.e., act as an effective damping element to the then inactive plate winding of the output transformer. During the negative halves of the grid signal voltage, the output tube is operated as a triode or near triode to prevent its plate current from ever reaching the cutoff point and to act as a low impedance shunt across the inactive plate winding of the output transformer. The action of this, otherwise inactive tube during the negative halves of the grid signal voltage, effectively prevents the occurrence of the notch distortion.

I claim:

1. As an output stage for a push-pull audio amplifier the combination comprising first and second tubes connected for push-pull anode loaded operation, each said tube including a cathode, anode, signal grid and a screen grid, a push-pull output transformer, said output transformer including first and second primary portions respectively connected to and loading the anodes of said first and second tubes, first and second pairs of common-cathode back-to-back arranged diodes connected in shunt respectively with said first and second primary portions of said output transformer, and circuit means respectively connecting the common cathodes of said first and second pairs of diodes to the respective screen grids of said first and second tubes for effecting automatic switching of each said screen grid alternately between the terminals of the corresponding primary portions of said output transformer.

2. A push-pull audio amplifier output stage as defined in claim 1 wherein said first and second portions of the primary of said output transformer are provided respectively with first and second pairs of taps, and said first and second pairs of diodes are connected respectively to said pairs of taps for shunting the same to thereby effect said automatic switching of each said screen grid alternately between said taps.

3. A push-pull audio amplifier output stage as defined in claim 1 wherein said first and second pairs of diodes are connected respectively in shunt between the appertaining anode terminals and the positive terminal of the power supply connected between the cathodes and a point on said transformer primary intermediate the first and second portions thereof to thereby effect said automatic switching of each said screen grid alternately between the apertaining anode terminal and said power supply terminal.

4. A push-pull audio amplifier output stage as defined in claim 1 wherein said first and second portions of the primary of said output transformer are each provided with a tap and said first and second pairs of diodes are connected respectively in shunt between the appertaining tap and the anode terminal of the appertaining tube to thereby effect said automatic switching of each said screen grid alternately between the corresponding tap and the anode terminal.

5. A push-pull audio amplifier output stage as defined in claim 1 wherein said first and second portions of the primary of said output transformer are each provided with a tap, and said first and second pairs of diodes are connected respectively in shunt between the appertaining tap and the positive terminal of the power supply connected between the cathodes and a point on said transformer primary intermediate the first and second portions thereof to thereby effect said automatic switching of each said screen grid alternately between the corresponding tap and said power supply terminal.

References Cited in the file of this patent

UNITED STATES PATENTS

| | | |
|---|---|---|
| 2,710,312 | Hafler et al. | June 7, 1955 |
| 2,868,896 | Gabor et al. | Jan. 13, 1959 |